United States Patent
Lang et al.

(10) Patent No.: US 11,838,610 B2
(45) Date of Patent: Dec. 5, 2023

(54) CAMERA SYSTEM

(71) Applicant: MEKRA Lang GmbH & Co. KG, Ergersheim (DE)

(72) Inventors: Werner Lang, Ergersheim (DE); Stefan Centmayer, Ergersheim (DE)

(73) Assignee: MEKRA LANG GMBH & CO. KG, Ergersheim (DE)

( * ) Notice: Subject to any disclaimer, the term of this patent is extended or adjusted under 35 U.S.C. 154(b) by 0 days.

(21) Appl. No.: 17/479,725

(22) Filed: Sep. 20, 2021

(65) Prior Publication Data

US 2022/0094831 A1    Mar. 24, 2022

(30) Foreign Application Priority Data

Sep. 24, 2020  (DE) .................... 10 2020 124 959.4

(51) Int. Cl.
*H04N 23/52* (2023.01)
*B60R 1/12* (2006.01)
(Continued)

(52) U.S. Cl.
CPC .............. *H04N 23/52* (2023.01); *B60R 1/12* (2013.01); *B60R 11/04* (2013.01); *H04N 23/51* (2023.01);
(Continued)

(58) Field of Classification Search
CPC ............. H04N 5/22521; H04N 5/2252; H04N 5/2251; H04N 5/2257; H04N 7/181;
(Continued)

(56) References Cited

U.S. PATENT DOCUMENTS

2003/0155001 A1    8/2003   Hoetzer et al.
2006/0232389 A1   10/2006   Chu
(Continued)

FOREIGN PATENT DOCUMENTS

DE        10012004       9/2001
DE       102005049566    4/2006
(Continued)

OTHER PUBLICATIONS

Proposal for Supplement 2 to the 04 series of amendments to Regulation No. 46 (Devices for indirect vision). httos://unece.org/DAM/strans/doc/201 5/wp29/ECE-TRANS-WP29-2015-084e.pdf (Year: 2015).*
(Continued)

*Primary Examiner* — Jason A Flohre
(74) *Attorney, Agent, or Firm* — Cozen O'Connor

(57) ABSTRACT

Camera system having a camera for a vehicle (F) for capturing the environment around the vehicle and a protection element. The camera has an optical element, with a light incidence portion (EB) and a retainer, which supports the optical element. The protection element is provided separately to the optical element and the retainer and is positioned at least on the light incidence portion (EB) of the optical element. The protection element has a sight opening, which exposes a use portion (NB) of the light incidence portion (EB). At least one gap between the optical element and the protection element for receiving a water drop (T), which is located on the use portion (NB), and a water drainage opening s distal from the sight opening is provided.

21 Claims, 15 Drawing Sheets

(51) Int. Cl.
  *B60R 11/04* (2006.01)
  *H04N 23/51* (2023.01)
  *B60R 11/00* (2006.01)

(52) U.S. Cl.
  CPC . *B60R 2001/1253* (2013.01); *B60R 2011/004* (2013.01); *B60R 2300/8046* (2013.01)

(58) Field of Classification Search
  CPC ........ H04N 23/52; H04N 23/51; H04N 23/50; H04N 23/57; B60R 1/12; B60R 11/04; B60R 2001/1253; B60R 2011/004; B60R 2300/8046; B60R 1/00; B60S 1/54; B60S 1/56; B60S 1/603; G03B 17/08
  See application file for complete search history.

(56) References Cited

U.S. PATENT DOCUMENTS

| | | | | |
|---|---|---|---|---|
| 2008/0112050 | A1* | 5/2008 | Nomura | G02B 1/18 359/507 |
| 2010/0165100 | A1* | 7/2010 | Asai | B60R 11/04 359/507 |
| 2010/0196000 | A1* | 8/2010 | Watanabe | B60R 11/04 396/429 |
| 2011/0073142 | A1* | 3/2011 | Hattori | B60S 1/52 134/198 |
| 2016/0377860 | A1* | 12/2016 | Numata | G02B 27/0006 359/507 |
| 2018/0164582 | A1* | 6/2018 | Kato | A61B 1/127 |
| 2018/0307009 | A1 | 10/2018 | Lang et al. | |
| 2020/0223401 | A1* | 7/2020 | Little | H04N 5/22521 |
| 2021/0051252 | A1* | 2/2021 | Cotoros | G03B 17/00 |
| 2022/0196963 | A1* | 6/2022 | Suginome | G03B 17/55 |
| 2022/0309889 | A1* | 9/2022 | Scalisi | G08B 13/1472 |

FOREIGN PATENT DOCUMENTS

| | | |
|---|---|---|
| DE | 10 2010 041 475 A1 | 6/2011 |
| DE | 10 2013 114 967 A1 | 7/2014 |
| DE | 10 2018 004 036 A1 | 11/2018 |
| EP | 3 832 386 A1 | 6/2021 |
| JP | H 03-123335 | 5/1991 |
| JP | H06-037802 U | 5/1994 |
| JP | 2004-182080 | 7/2004 |
| JP | 2006-313312 | 11/2006 |
| JP | 2007-316167 | 12/2007 |
| JP | 2008148276 A | 6/2008 |
| JP | 2009-157194 A | 7/2009 |
| JP | 2011-244417 | 12/2011 |
| JP | 2014-182255 A | 9/2014 |
| JP | 2015-018106 A | 1/2015 |
| JP | 2015-152882 | 8/2015 |
| JP | 2018-194826 | 12/2018 |
| WO | WO 2020/022505 A1 | 1/2020 |

OTHER PUBLICATIONS

EPDM rubber "https://en.wikipedia.org/w/index.php?title=EPDM_rubber&oldid=1120650771" (Year: 2022).*
Search Report dated Jan. 13, 2022 issued in European Patent Application No. 21187701.4.

* cited by examiner

CAMERA SYSTEM

BACKGROUND OF THE INVENTION

1. Field of the Invention

The present invention relates to a camera system, in particular a camera system for a vehicle which has a protection element.

2. Description of the Related Art

For motor vehicles, it is legally prescribed to make so-called fields of view around the vehicle visible for the driver during driving operation. Which fields of view have to be visible, is based on the type of the motor vehicle, for example, motor cycles, motor vehicles for transporting passengers, motor vehicles for transporting goods, etc. The visibility of the fields of view has to be provided by a device for indirect view, and the fields of view have to be visible for the driver sitting on the driver's seat all the time by using the device for indirect view. Dependent on the type of the vehicle and, in particular, on which areas around the vehicle can be directly viewed by the driver, different legal prescriptions require that certain fields of view are permanently and reliably visible at all times by using the device for indirect view. In Europe, the fields of view which have to be reliably visible at any times for a driver are defined in the UN/ECE regulations No. 46. Further relevant norms and regulations include, for instance, ISO 5721, ISO 5006, ISO 16505, ISO 14401 and EU 167/2013. Beside the legally required fields of view, often further areas around the vehicle, so-called regions of view, are made visible by devices for indirect view. Regions of view may contain legally prescribed fields of view.

Usually, the observation of the fields of view is possible with one or more mirrors. However, mirrors have some drawbacks. For example, mirrors show a driver merely objects which are on the same side of the mirror as the driver. Any object behind a mirror cannot be shown by this mirror. Additionally, mirrors which are merely made of flat glass show the driver a small area, except for the mirrors are very close to the driver. In case they are formed convexly, they generate an image distortion. Large vehicles commonly have six or more mirrors which are mounted around the outer side of the vehicle, most of them being convex and distorted which makes it difficult for the driver to pay attention to all relevant mirrors at the same time. Nevertheless, despite all the mirrors, there are still blind spots in the regions of view, i.e. the regions in which no fields of view are located, around these vehicles.

In recent times, it has been increasingly common to consider the use of camera systems as device for indirect view either in addition or as replacement for the mirrors as device for indirect view. In such camera systems, an image is continuously captured, detected and processed, respectively, and, if so, stored. The (video) data which are captured by an image capture unit with an image sensor device are transmitted, e.g., by use of a supply unit and, optionally, after processing, to a reproduction device which is located in the driver's cabin. The reproduction device reproduces a view of the respective legally prescribed field of view or a plurality of fields of view and, optionally, further information such as potential collision risks, distances to other objects, etc. for the area around the vehicle in a manner that the fields of view are permanently visible for the driver at all times. At the same time, view systems promote an improved night view, more flexible possibilities for arrangement and the possibility to view larger fields of view with a lower distortion.

Permanently visible means in this context that the view into the field of view is depicted in a timely uninterrupted manner, that is, not interrupted by alternatingly showing and hiding the field of view or parts thereof or by overlaying other representations such that the field of view cannot be seen completely. Accordingly, the respective field of view or the fields of view are continuously and in real time shown and made visible, respectively, on the display device. This holds at least for fields of view which are prescribed as permanently visible for all vehicle conditions in which the ignition is switched on and/or, preferably, for example, coupled to a sensor which receives a corresponding signal, for example, a door opening signal or an ignition switch signal.

For such mirror replacement systems, partly, cameras with very specific arrangements of objectives and lens systems, respectively, which are composed of a plurality of separate lenses are applied, in order to deal with the specific requirements with regard to the depiction characteristics of the camera, the distortion by the opening of the objective and so on. Thereby, such arrangements of objectives are often only used in a partial portion of the opening of the objective which is possible at maximum, i.e., a partial image is cut out from the entire image captured by means of the objective and is used for depiction because the arrangement of objectives mainly has the required characteristics in the used portion and does not have these characteristics in other portions, e.g., border portions.

Commonly, the camera systems are mounted on an outer side of the vehicle, in order to capture a portion around the vehicle. However, by mounting on an outer side of the vehicle, the camera systems are subjected to environmental impacts, such as pollutions or precipitation. In particular, water drops, for example, rain drops or precipitation by fog or snow, may deposit on the optical element of the camera, such as the lens of the camera, or generally an element, which closes the camera to the outer side and thereby impair the image data captured by the camera of the vehicle environment. In particular, it may arise by water drops on the camera lens that objects or persons in the vehicle environment are hidden partially or completely by the foreign particle and, thus, are not or not satisfactorily shown to the driver on a reproduction unit which is usually mounted on the driver's cabin. This, in turn, results in that the driver does not sufficiently or not at all recognize objects or persons. Thereby, it may arrive at collisions with the objects or persons not recognized by the driver and, thus, potentially at heavy accidents.

From the prior art, thus, camera systems are known which remove water drops by means of an air jet, a wiping apparatus, such as a wiping arm, or by means of a rotating lens or a hydrophobic coating of the lens. Finally, it is also known to position a cylinder around the lens, in order to hinder water drops to flow onto the lens.

However, the camera systems of the prior art have the drawback that with changing environmental conditions, such as the change of the wind direction or the quantity of precipitation, the water drops on the lens may only be removed insufficiently and, thereby, a realistic depiction of the vehicle environment which is well to realize for the driver of the vehicle is not possible.

SUMMARY OF THE INVENTION

Accordingly, it is an object of the present invention to provide a camera system for a vehicle, in particular a commercial vehicle, which allows a reliable removal of water drops from the optical element during all environmental conditions and also during quick changes between different environmental conditions.

The disclosure is based on the idea to focus for the removal of water drops only on the part of the optical element, which is relevant for a depiction of the vehicle environment, i.e., the use portion of the optical element. With depiction of a vehicle environment, usually, a part of the vehicle environment is captured by an image capture unit and is correspondingly shown which is significantly larger than the part of the vehicle environment which is actually interesting for the driver. For example, it may be the case that due to a certain lens arrangement or lens geometry only a comparatively small part of the captured vehicle environment is used for depiction of the same on a reproduction unit. The remaining part of the vehicle environment is not shown to the driver on the reproduction unit. Accordingly, it is irrelevant for a reliable and realistic depiction of the vehicle environment, whether there are one or more water drops on the part of the optical element which captures the portion of the vehicle environment which is not to be depicted or not, or whether light beams for depiction can even fall on this part of the optical element or not. In other words, water drops on the part of the optical element which captures the portion of the vehicle environment which is not to be depicted are anyway not depicted on the reproduction unit why they may stay there, and it is irrelevant, respectively, whether the vehicle environment is captured with this part of the optical element or not. A removal of water drops on the part of the optical element, which captures the portion of the vehicle environment which is to be shown and, thus, forms the use portion of the optical element, is requested only there, however, with a large reliability.

Generally, the optical element is the element of the image capture unit which is located in an optical path, i.e., the way which is covered by the light when passing through the image capture unit from a light source or the vehicle environment, between the position where the light enters the image capture unit and the position where the light impacts on the image sensor. In other words, the optical element is an element of the image capture unit which extends until the outermost position of the image capture unit and, thus, forms the element of the image capture unit which is directed to the environment of the vehicle. The optical element correspondingly has a light incidence portion where the light beams from the vehicle environment impact and into which they are guided. The light incidence portion, thus, is the portion of the optical elements through which the light beams pass and through which they are consequently optically guided. The use portion of the optical element is part of the light incidence portion of the optical element. The optical element, for example, may be an objective. The optical element is usually supported by a retainer in the camera system. The retainer may be a sleeve, which encompasses the optical element from the outer side or a bracket, which grasps the optical element from the outer side, such as an objective ring. Further constructions for the retainer are conceivable dependent on the geometry and the structure of the optical element.

In order to protect the part of the optical element, which is relevant for depiction of the vehicle environment, from a deposit of water drops, the camera system according to the invention has a protection element with a sight opening. The protection element is a component which is separate to the optical element and which is arranged on the light incidence portion in the state mounted in the camera system such that the provided sight opening leaves the part of the optical element which is relevant for depiction of the vehicle environment blank, e.g., the protection element is a lid-similar component. The sight opening is an opening and a concavity, respectively, in the protection element, which provides a communication from the outer side of the protection element to an inner side of the protection element. Conveniently, the sight opening has a geometric shape, which reduces the light beams falling into the light incidence portion of the optical element in the mounted state to a degree, which is required for depiction of the vehicle environment on the reproduction unit. Portions of the optical element, which are not relevant for the depiction are hidden such that no light beams enter through these hidden portions into the optical element. Thereby, the geometric shape of the sight view is preferably adapted to the use portion of the optical element. In the mounted state of the protection element, the sight opening is arranged such that the use portion of the optical element is exposed to the vehicle environment. Thus, the light beams may fall into and enter, respectively, the use portion of the optical element via the sight opening. At the same time, the quantity of water potentially impacting on the optical element is reduced in that a part is completely covered and the use portion is protected by the protection element at least sidewards.

The protection element is arranged on the optical element such that at least one gap is present between the optical element and the protection element. The gap extends from the edge of the use portion until a water drainage opening. The water drainage opening is arranged distally to the use portion and is open toward the vehicle environment. Distal to the use portion presently means that the water drainage opening has a significant distance to the use portion, is preferably arranged at the end of the gap. It does not open toward the use portion.

The water drainage opening may be a bore or notch provided in the protection element, which constitutes a communication between an inner side and an outer side of the protection element. Alternatively, the water drainage opening may also be formed in that the protection element does not reach at least partly the retainer at its end distal from the sight opening and, thus, provides a clearance between the retainer and the protection element through which water may flow to a vehicle environment. Thus, the water drainage opening constitutes a communication between the gap and the vehicle environment. Thereby, water drops which are located on the use portion of the optical element may flow into the gap and may exit toward the vehicle environment through the water drainage opening. Because the use portion is a comparatively small portion of the entire light incidence portion, the water drops often lie at the edge of the use portion or in direct proximity thereof and, thus, close to the gap and can thereby easily flow there into. Water drops, which do not lie in the proximity of the gap, i.e., rather lie in the center of the use portion, may be urged toward the edge of the use portion by a convex curvature of the optical element, vibrations during driving operation, airflow or combinations thereof and subsequently may flow into the gap. Once the water drop has entered the gap, it flows toward the water drainage opening where it is discharged from the protection element. Because the water drainage opening is arranged distally to the use portion, it is avoided that the water drop which is discharged through the gap arrives again on the use portion and, due to its remaining there, hinders or impairs the view into the vehicle environment.

The protection element may have a lighting device for lighting and, thus, an improved capturing of the vehicle environment. The lighting device may, for example, be an infrared light.

Further, the protection element may have a defined coding for attachment at the correct position relatively to the optical element. The coding may be a notch, which runs in the longitudinal direction of the retainer of the optical element into which notch a corresponding projection at the protection element engages and secures the protection element radially against rotation. Alternatively, the protection element and the retainer of the optical element may each have a colored identification mark, which, in the correct posture relatively to each other, shows a technician or a user of the camera system that the protection element is located in the suitable position relatively to the optical element. So it is ensured that the sight opening is located, in the mounted state of the protection element and the optical element, exactly above/on the use portion of the light incidence portion of the optical element and that the vehicle environment may be reliably captured via the use portion.

The protection element may either be screwed by means of a thread onto the retainer and the optical element, respectively, or may be clamped to the retainer and the optical element, respectively. In principle, the mode of fixation of the protection element at the camera is dependent on the construction of the protection element and is dependent on whether the protection element is a separate component or part of a camera housing or a camera retainer.

The protection element may be formed in two or multiple parts. For example, the protection element may consist of a cover plate which is arrange above/on the light incidence portion of the optical element and may be composed of a ring which is connected to the cover plate (e.g., by means of a thread) which ring encompasses the optical element or the retainer circumferentially.

The protection element may be provided with a hydrophilic coating. A hydrophilic coating means a coating, which draws water, such as a nano-coating by mineral particles which improve the entering of water into the gap.

Preferably, the gap is dimensioned such that it deploys a capillary action with receiving of the water drop. A capillary action generally means the behavior of fluids to flow against the gravitational force into capillaries with contact with the capillaries, i.e., for instance, sufficiently small tubes, gaps or cavities in solids, e.g., to climb in the capillaries upwards. These effects are caused itself by the surface tension of fluids and the interfacial surface tension of fluids with the solid surface (for example: glass). Presently, thus, the gap is configured such that it forms a capillary. With contact of a water drop with the opening of the gap, the water drop is drawn into the gap by the capillary action, i.e., a suction effect is generated by the capillary action by which the drop is dragged into the gap. For achieving of a capillary action, the gap may, for example, be dimensioned in dependency on the size of the drop to be removed. For example, it may be that drops smaller than 0.5 mm are considered as not disturbing for the depiction of the vehicle environment. Then, the gap is configured such that it causes at least a capillary action for drops equal to or larger than 0.5 mm.

According to a preferred embodiment, the optical element has a hydrophobic coating, which has a sufficient light transmission for capturing of the vehicle environment. A hydrophobic coating means a water-repellent coating, which is provided/applied by a suitable surface treatment of the optical element or which is formed by a suitable material. A water-repellent coating has the advantage that water drops which are not located at the edge of the use portion and, thus, in direct proximity to the gap may easily slide to the edge of the use portion by vehicle vibrations during vehicle operation, airflow or combinations thereof. Further, the capillary action is intensified by a hydrophobic coating in that a contact angle relatively to the fluid is increased and the water drop tends to flow into the gap. The contact angle mean the angle between the water drop and the surface of the use portion of the optical element. With a small contact angle, the water drop lies relatively flat on the use portion, whereas, with a large contact angle, the water drop rather maintains its drop shape and, thus, a smaller contact surface is present between the water drop and the use portion. Alternatively, a hydrophobic and, thus, water-repellent surface may also be achieved by providing a certain roughness or grain. Further, a hydrophobic coating of the optical element protects the optical element against wear. With provision of a hydrophobic coating, the gap is dimensioned in dependency on the hydrophobic coating and, thus, the predetermined drop shape. Alternatively or additionally, the gap may also be dimensioned based on the curvature of the first optical element.

Preferably, the gap has a cross-section, which changes along its extension. Thereby, in particular the capillary action may be increased because the gap generates a capillary action for water drops of different diameters and sizes, respectively. For example, the gap may be configured narrow at the edge of the sight opening and expanding toward the water drainage opening. Thereby, it is ensured that drops of all sizes and geometries may flow into the gap and, there-by, a capillary action is caused right from the beginning regardless of the size of the drop. However, it is also conceivable that the cross-section of the gap decreases along its extension with increasing distance from the sight opening. Thus, a capillary action is generated for relatively large water drops on the use portion only, smaller water drops flow into the gap without capillary action. However, by the increasing narrowing of the gap in moving direction of the water drop, a capillary action is also achieved for smaller water drops and water drops of any size reliably flow through the gap to the water drainage opening where they are discharged to the vehicle environment.

Preferably, the gap is formed by at least one inner notch which is provided in at least a surface of the protection element which faces the light incidence portion of the optical element. The inner notch is a recess in the surface of the protection element which corresponds to at least the surface which faces the light incidence portion of the optical element and, thus, corresponds to the inner side of the protection element, which is oriented toward the light incidence portion of the optical element. The inner notch, however, may also extend along surfaces of the protection element which lie further inwards. With more than one inner notch, the inner notches may have different cross sections, which extend laterally to the flowing direction (different sizes and/or shapes). The inner notch may also extend in a portion of the inner surface of the protection element only, such as close to the sight opening.

The inner notch advantageously extends radially to an outer side of the surface of the protection element, which is oriented toward the light incidence portion. Alternatively, the inner notch may extend spirally to an outer side of the light incidence portion. The spiral extension of the inner notch, thereby, runs around the view opening. Further alternatively, the inner notch may extend approximately concentrically around the sight opening of the protection element.

Alternatively or additionally, the inner notch may have a cross section in the direction to an outer side of the surface of the protection element, which is oriented toward the light incidence portion, which cross-section changes laterally to the flowing direction of the drop. For example, the inner notch may be configured such that it expands from an inner side of the protection element toward an outer side of the protection element. Alternatively, the inner notch may have an arc-shaped, triangular, etc. cross section. Also a cross section, which changes in the outward direction of the light incidence portion lateral to the flowing direction of the drop has the advantage that the capillary action is further improved and the inner notch can be used for a plurality of drop sizes.

According to a preferred embodiment, the inner notch forms a channel from the sight opening to the water drainage opening. In other words, the inner notch extends from the edge of the sight opening to the water drainage opening.

Alternatively to the embodiments, in which an inner notch is used for discharging the water drop, a gap may also be formed in that the surface of the protection element facing the optical element is spaced from the light incidence portion of the optical element. That is, the protection element is entirely and, thus, not only partially arranged in a certain distance to the light incidence portion and the gap radially extends along the entire protection element.

In order to ensure a defined distance of the protection element from the optical element, the surface of the protection element facing the optical element has at least one rib, which sup-ports the protection element at the retainer and/or the optical element. With two ribs, an inner notch may be formed. In case of multiple ribs, a plurality of inner notches may be formed.

Preferably, an outer side of the protection element has a geometry (e.g., at least one outer notch), which generates an air swirl. The air swirl may promote a movement of a water drop which is located on the use portion toward the gap and/or may prevent a movement of a water drop located on an outer side of the protection element toward the sight opening. For example, the geometry on the outer side is configured, such that the water drop is selectively guided away from the sight opening, such as by at least one outer notch, rib or seam, which are arranged concentrically around the sight opening or are radially extending away from the sight opening on the outer side of the protection element.

Alternatively or additionally, the protection element may have a nozzle, which applies a medium onto the light incidence portion of the optical element and, thus, promotes a movement of a water drop located on the use portion toward the gap and/or prevents a movement of a water drop located on an outer side of the protection element toward the sight opening. The nozzle may be an air nozzle, which applies air onto the use portion of the light incidence portion. In this respect, the air nozzle may be arranged on the outer side of the protection element or inside the protection element, such as in the gap. Alternatively, the nozzle may be an air nozzle, which is arranged at an outer side of or close to the protection element and applies air to either the use portion of the light incidence portion or to an outer side of the protection element. Further, alternatively or additionally, the air nozzle may be arranged such that it blows at least partially air directly into the gap and, thus, additionally urges the drops into the gap.

The protection element may be a lid, which is provided separately to the optical element and the retainer of the optical element, but can also be part of a camera housing or a camera retainer. For example, the protection element may be part of a camera arm and may be connected thereto by means of a ridge/bar. The protection element, therefore, is configured detachably and exchangeable such that, for example, for cleaning or maintenance and repair, respectively, of the optical element it may be removed from the optical element.

In order to deice the camera and, in particular, the optical element or to remove condensed water from the optical element, the protection element further has a heating element. The heating element is preferably a heating foil, but may also be a heating wire, and is preferably arranged in the gap. Generally, the heating element may be fixed directly to the protection element, for example, by using a heating wire by means of inserting and molding or by using a heating foil by adhesive bonding. However, the gap may not be completely closed by the heating element such that water drops may further be reliably discharged through the gap. In particular, with provision of a heating element, it may be advantageous, if the protection element is configured from two or multiple parts, because this facilitates the installation of the heating element.

According to a preferred embodiment, the protection element is made of a polymer, such as a thermoplastic, a thermosetting plastic, an elastomer or combinations thereof. Alternatively, the protection element may also be made of a metallic material. Furthermore, the protection element is preferably manufactured from an opaque material, but may also be manufactured from a transparent material. An opaque material has the advantage that no light beams may fall from the vehicle environment into the part of the light incidence portion of the optical element, which does not correspond to the use portion. Thus, no optical interferences, such as reflections or the like, may disturb the depiction of the vehicle environment on the image sensor.

According to a preferred embodiment, the protection element has a Shore-hardness of less than 60 Shore and, thus, fulfils legal prescriptions (e.g., UN ECE/R46) for materials for components, which have sharp edges (such as ribs at the protection element).

Preferably, the sight opening and the gap are dimensioned, such that an adjustment of the camera in a certain range is possible without hiding the use portion by the protection element and closing the gap. In this respect, the sight opening may be larger than the use portion, and the gap may be dimensioned such that it is not closed by approaching of the retainer or the optical element to the protection element, despite a rotation of the camera in a certain range, such as around 10 degree. This is in particular advantageous, if the protection element is part of the camera housing and an adjustment of the camera does not result in an adjustment of the protection element, too, however, may also be advantageous for other constructions, wherein the protection element is attached directly on the optical element and/or the retainer.

Preferably, the camera system is part of a mirror replacement system, e.g., as it is defined in the UN regulation UN ECE/R46.

Because the camera system according to the invention focusses only to a certain part of the light incidence portion, namely the use portion, of the optical element with respect to protection and removal of water drops, the camera system according to the invention has the ad-vantage in view of the camera systems known from the prior art that, on the one side, it is pre-vented that, in principle, water drops land on the relatively small use portion of the optical element of a camera, on the other side, however, water drops, which deposit here nevertheless, are quickly removed. By the quick removal of the water drops, also relatively large quantities of water, such as during a heavy rainfall, may be managed. The protection element, further, protects the covered part of the light incidence portion against mechanical influences, such as stone chipping or scratches by branches, against optical effects, i.e., unwanted light effects, against freezing and against UV-radiation. The protection element, furthermore, promotes the integration of further auxiliary components, such as the nozzle, the lighting and the heating element, in an easy manner. Finally, the protection element makes it possible to prevent light beams, which are irrelevant or even inappropriate for the vehicle environment to be depicted to impact on the use portion by the selective arrangement of the sight opening on the use portion of the optical element. Thus, inter alia, negative effects to the image depiction, such as light refractions or reflections, may be prevented.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, the invention is exemplarily described by reference to the accompanying figures, in which.

DETAILED DESCRIPTION OF THE PRESENTLY PREFERRED EMBODIMENTS

Figure 1:
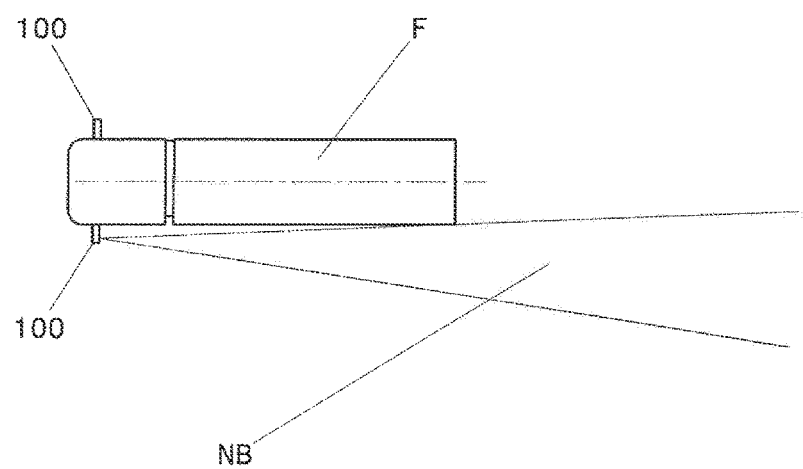
FIG. 1 a plan view of a vehicle with a left and right camera system.

FIG. 1 shows a plan view of a commercial vehicle F presently a truck with a tractor and a semi-trailer/trailer. A camera system 100 is attached to each of the left and right sides of the tractor. The camera system 100 captures an environment around the vehicle F by means of a use portion NB of an optical element 11.

Figure 2:
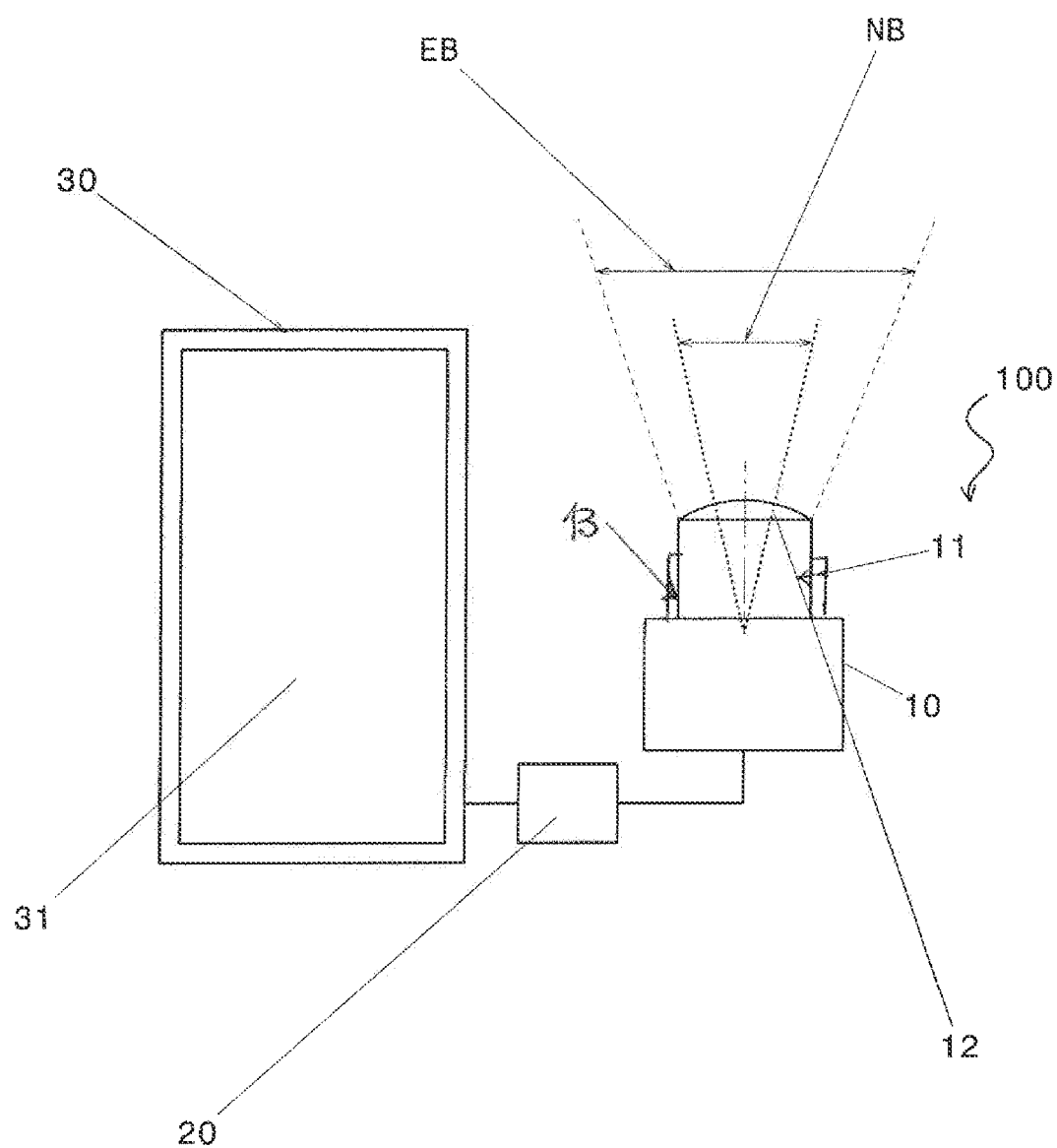
FIG. 2 shows a schematic representation of a view system with a camera system known from the prior art.

FIG. 2 schematically shows a view system known from the prior art. The view system has a processing unit 20, such as an ECU, and a reproduction unit 30, such as a monitor, e.g., a TFT-, LCD-monitor. A depicted portion 31 is present on the reproduction unit 30.

The view system further has a camera system 100, which comprises a camera 10, such as a camera with a CMOS- or CCD-technology. The camera 10 has an optical element 11, such as an objective, and a retainer 13. The retainer 13 circumferentially supports the optical element 11. The optical element 11 has a light incidence portion EB at a surface 12 directed to the vehicle environment, which light incidence portion EB is configured convexly. The light incidence portion EB is the portion of the optical element 11 into which light beams of a vehicle environment enter into the optical element 11. A part of the light beams which enter into the light incidence portion EB is depicted on an image sensor (not shown) and, thus, projects the vehicle environment on the image sensor. The part of the light incidence portion EB onto which the light beams impact, which are depicted on the image sensor and which are depicted on the portion of the image sensor, respectively, which is represented to the driver, is called use portion NB of the optical element 11.

Figure 3:
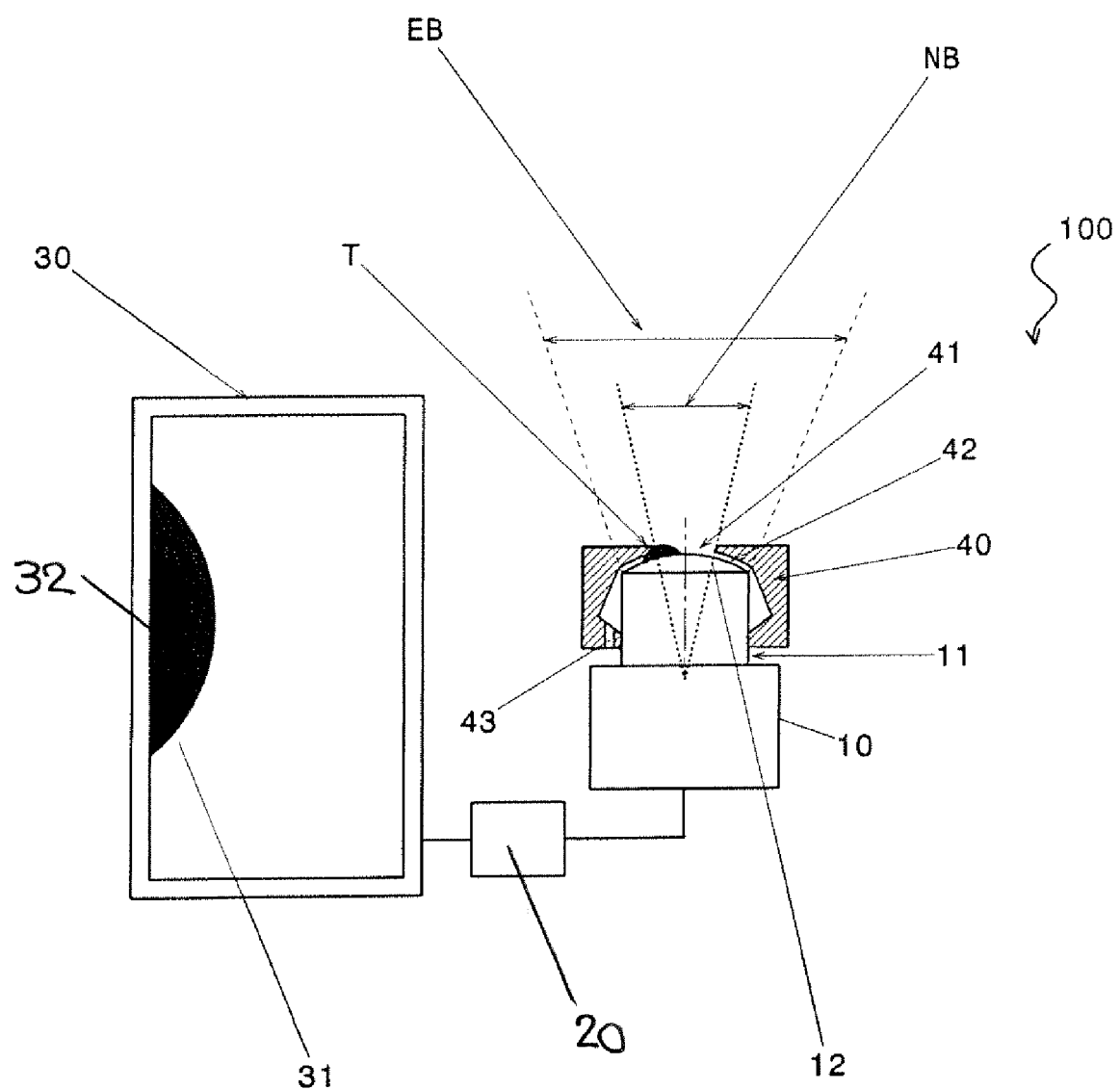
FIG. 3 shows a schematic representation of a view system with a camera system according to the invention of a first embodiment in a first state.

FIG. 3 schematically shows a view system with a camera system 100 according to the invention. As the view system shown in FIG. 2, the view system shown in FIG. 3 also has a processing unit 20 and a reproduction unit 30. The camera system 100 of FIG. 3 differs from the camera system of FIG. 2 in that it is additionally provided with a protection element 40. The protection element 40 is configured as a kind of lid, which is arranged on the optical element 11 and is fixed to the optical element 11 and the retainer (not shown in FIG. 3), respectively, via a clamping joint. The protection element 40 is an additional component, which is separate to the retainer 13 of the optical element 11. In particular, preferably, the protection element 40 is removable from the camera system 100, without destroying the optical element 11 and its arrangement in its retainer. In other words, the optical element 11, the retainer 13 and the image sensor form a permanent/inseparable unit, which has to cooperate together for the function of the camera 10, whereas the protection element 40 is an additional component, which may be provided on the camera 10, in order to protect the use portion NB of the optical element 11 against water deposition or in order to selectively remove possible water depositions on the use portion NB of the optical element 11. Therefore, the protection element 40 may also be retro-fitted with existing cameras 10.

The protection element 40 has at the side, which covers the light incidence portion EB of the optical element 11 a sight opening 41. The sight opening 41 is a through-opening, which connects an outer side of the protection element 40 with an inner side of the protection element 40. That is, the sight opening 41 is a recessed, open portion of the protection element 40. The size and geometry of the sight opening 41 corresponds approximately to the size and geometry of the use portion NB. At the end of the protection element 40, which is located distal to the sight opening 41, a water drainage opening 43 in shape of a bore is provided in the protection element 40. The water drainage opening 43 constitutes a communication between an inner side of the protection element 40 and an outer side of the protection element 40. The protection element 40 is spaced from the optical element 11 such that a gap 42 is present between the optical element 11 and the protection element 40.

As shown in FIG. 3, a water drop T is located on the surface 12 of the optical element 11, which faces a vehicle environment. Specifically, the water drop T is arranged on the convex light incidence portion EB of the optical element 11 such that it lies partially on the use portion NB of the optical element 11 (first state). This results in that the light beams, which fall into the optical element 11 through the use portion NB depict the water drop T on the image sensor and, thus, the depicted portion 31 of the reproduction unit 30, namely, as dark spot 32.

Figure 4:
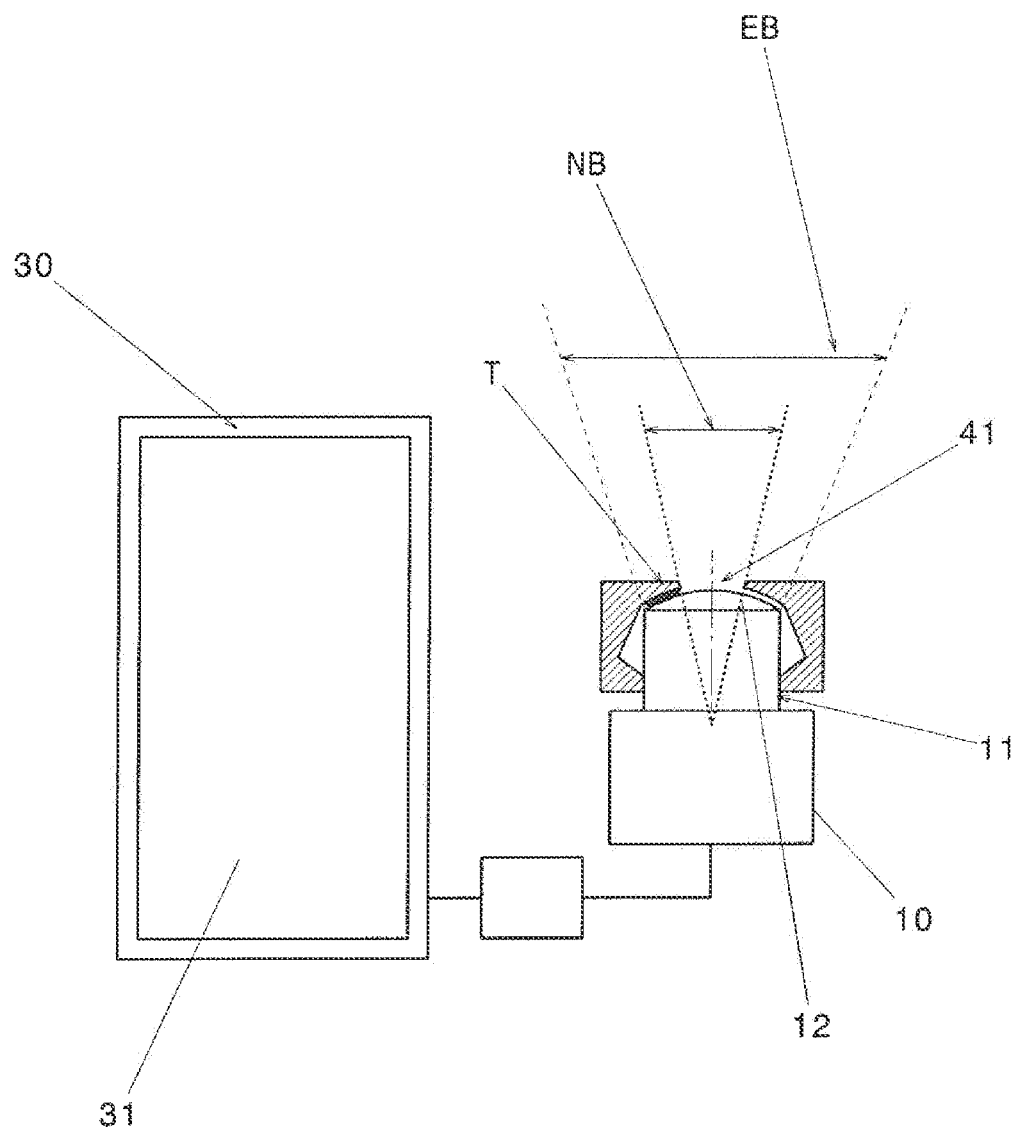
FIG. 4 shows a schematic representation of the view system of FIG. 3 in a second state.

In FIG. 4, the camera system 100 of FIG. 3 is shown. Contrary to the first state shown in FIG. 3, in FIG. 4, the water drop T is flowed into the gap (second state) and is no longer depicted on the image sensor and, thus, the depicted portion 31 of the reproduction unit 30. For example, the water drop T may arrive in the gap 42 in that it is moved by the airflow and/or vibrations during driving operation of the vehicle F to an outer side of the use portion NB. In case of a contact between the water drop T and the entrance into the gap 42 at the sight opening 41, the water drop T slides into the gap 42. There, it moves by airflow and/or vibrations and/or subsequent water drops T within the protection element 40 away from the sight opening 41 toward the water drainage opening 43 and is discharged through the water drainage opening 43 from the gap 42 to the vehicle environment. In this way, it can be prevented that, during strong precipitation, such as heavy rain fall, the gap 42 and the clearance between the protection element 40 and the optical element 11 and the retainer 13, respectively, is filled with water and disturbs the function of the optical element 11, in that no further water drops may be discharged or—with corresponding weather conditions—the water freezes in the gap 42 and the clearance between the protection element 40 and the optical element 11 and the retainer 13, respectively, and damages the protection element 40.

Alternatively or additionally, with a suitable dimensioning of the gap 42, the water drop T may also be drawn into the gap 42 by capillary action, as soon as it contacts the entrance of the gap 42. As the capillary action is dependent on the size of the gap 42 relative to the size of the water drop T, the gap may have a cross section, which changes along its extension or changes laterally to the flowing direction of the water drop, in order to reliably remove in this way as many water drops as possible, which differ in shape and size, from the use portion NB of the optical element. The usage of the capillary action has the advantage that the water drops T, which are located on the use portion NB, may flow away faster than compared to no capillary action and also in directions, which otherwise would not allow a movement of drops due to the gravity.

Figure 5:
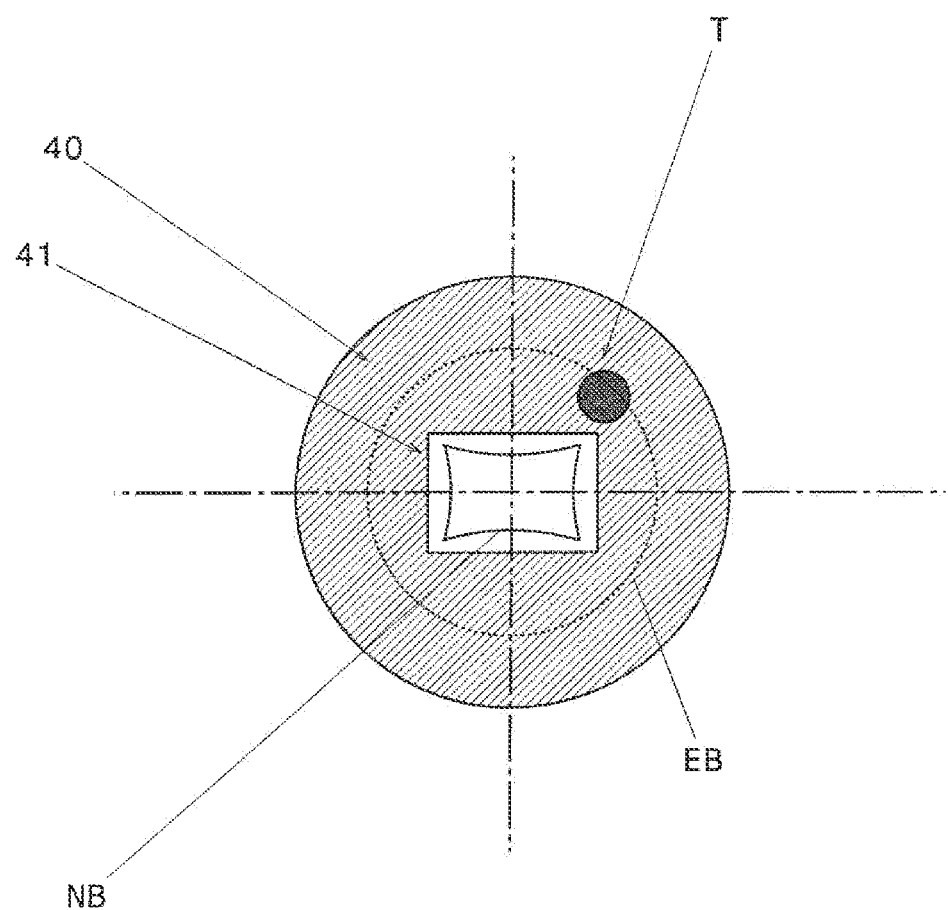
FIG. 5 shows a front view of the camera system according to the invention of FIG. 4.

In FIG. 5, a front view of the camera system of FIG. 4 is shown. As shown in FIG. 5, the geometry and size of the sight opening 41 of the protection element 40 corresponds approximately to the geometry and size of the use portion NB. Specifically, the sight opening 41 is slightly larger than the use portion NB and is a regular rectangle. However, it should be understood that the use portion NB and, thus, also the sight opening 41 may adopt each other geometry and size—dependent on the optical element 11 and the requirements on the use portion NB.

FIG. 6 to FIG. 9 show different embodiments (a second to fifth embodiment) of the protection element 40 according to the invention.

Figure 6:
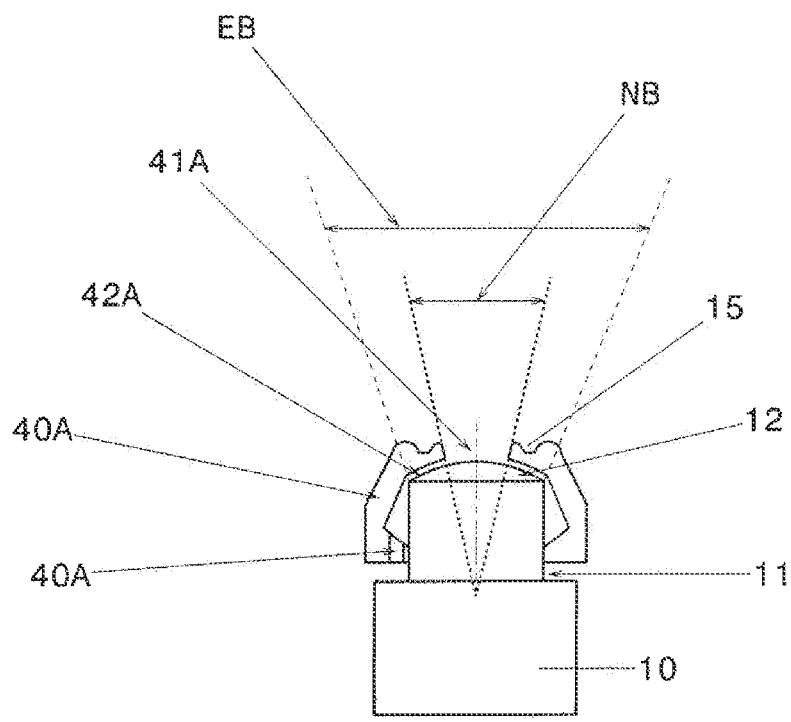
FIG. 6 shows a schematic representation of a camera system of a second embodiment.

In FIG. 6, a second embodiment of the protection element 40A is shown. In contrast to the first embodiment of the protection element 40, the protection element 40A has, on the outer side, which is opposed to the light incidence portion EB, a circumferential outer notch 15. The outer notch 15 is provided concentrically around a sight opening 41A and serves for swirling of air, in order to urge water drops, which are located on the use portion NB, toward a gap 42E and/or to hinder water drops T, which are located on the outer side of the protection element 40A to flow onto the use portion NB. As the protection element 40, protection element 40A also has a water drainage opening distal from the sight opening 41A.

Figure 7:
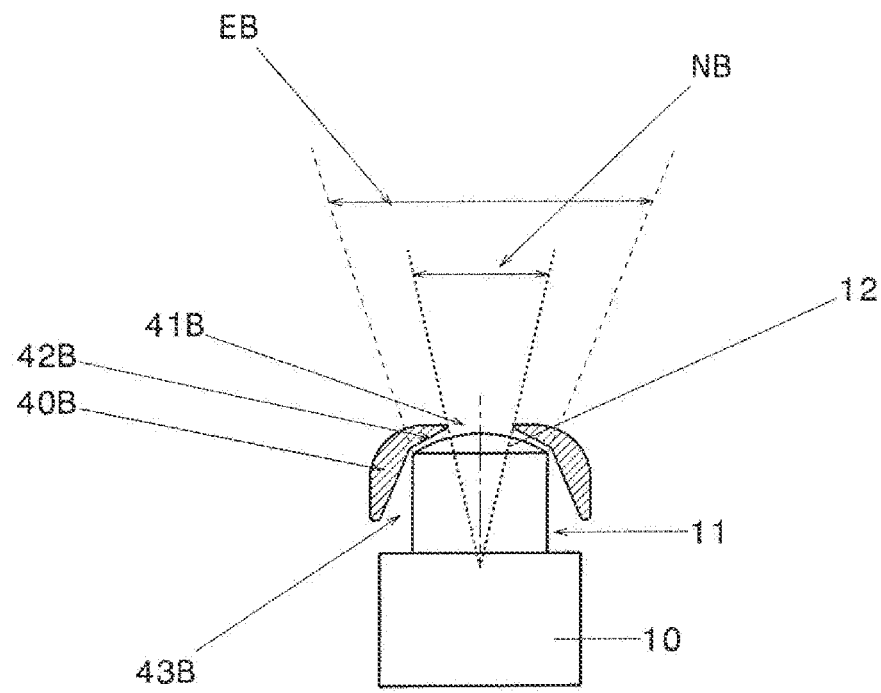
FIG. 7 shows a schematic representation of a camera system of a third embodiment.

In FIG. 7, a third embodiment of the protection element 40B is shown. In the embodiment of protection element 40B shown in FIG. 7, the protection element 40B is part of a camera housing (not shown). In this case, the water drops T do not directly flow to the vehicle environment via the water drainage opening 43B, but firstly flow into the camera housing. However, in order to selectively discharge the water drops T to the vehicle environment, presently, also the camera housing has to have an opening, which constitutes a communication to the vehicle environment and ensures a discharge of the water drops. The protection element 40B shown in FIG. 7 has a sight opening 41B and a gap 42B, as they have already been described above with respect to the protection elements 40 and 40A.

Figure 8:
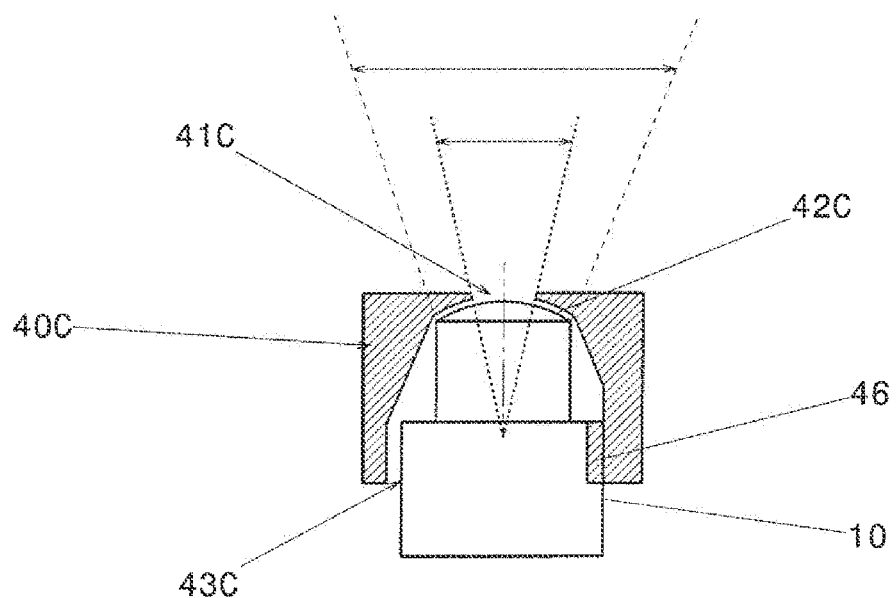
FIG. 8 shows a schematic representation of a camera system of a fourth embodiment.

In FIG. 8, a fourth embodiment of the protection element 40C is shown, which differs from the second embodiment shown in FIG. 6 in that the water drainage opening 43C is formed by providing a notch in the inner surface of the protection element 40C. Further, the protection element 40C is not clamped with the optical element 11 and the retainer 13, respectively, as shown in FIG. 3, but is connected to the optical element 11 and the retainer 13, respectively, by means of a threaded connection 46. The protection element 40C shown in FIG. 8 has a sight opening 41C and a gap 42C as they have already been described above with respect to the protection elements 40, 40A and 40B.

Figure 9:
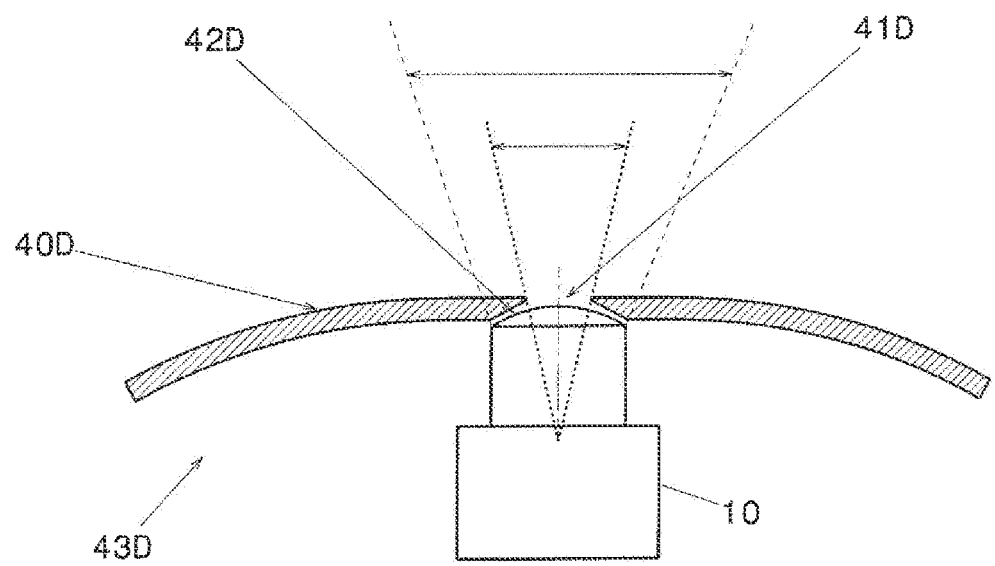
FIG. 9 shows a schematic representation of a camera system of a fifth embodiment.

In FIG. 9, a fifth embodiment of the protection element 40D is shown. In contrast to the previous embodiments of the protection element 40, 40A, 40B, 40C, the protection element 40D is part of a camera retainer and a camera housing, specifically a camera arm (not shown). In this respect, the protection element is connected with the camera arm via ridges/bars (not shown). As with the embodiment shown in FIG. 7, with the protection element 40D, the water drops are also not directly discharged to the vehicle environment after passing of the gap 42D and the water drainage opening 43D, but are firstly discharged into the camera arm and, from there, are discharged to the vehicle environment via a corresponding opening in the camera arm. The protection element 40B shown in FIG. 9 has a sight opening 41D as it has already been described above with respect to the protection elements 40, 40A, 40B, 40C.

In particular, with respect to the embodiments shown in FIGS. 7 and 9, in which the protection element 40B, 40D is formed as part of a camera housing, it may be advantageous, if the sight openings 41B and 41D are configured slightly larger than the use portion NB. This has the advantage that the camera 100 may be rotated and adjusted, respectively, in a certain frame, which is predetermined by the size and the geometry of the sight opening 41B, 41D, without closing the gap 42B, 42D with the camera 100 (in particular with the optical element 11 or the retainer 13) or covering the use portion NB with the protection element 40B, 40D.

Figure 10:
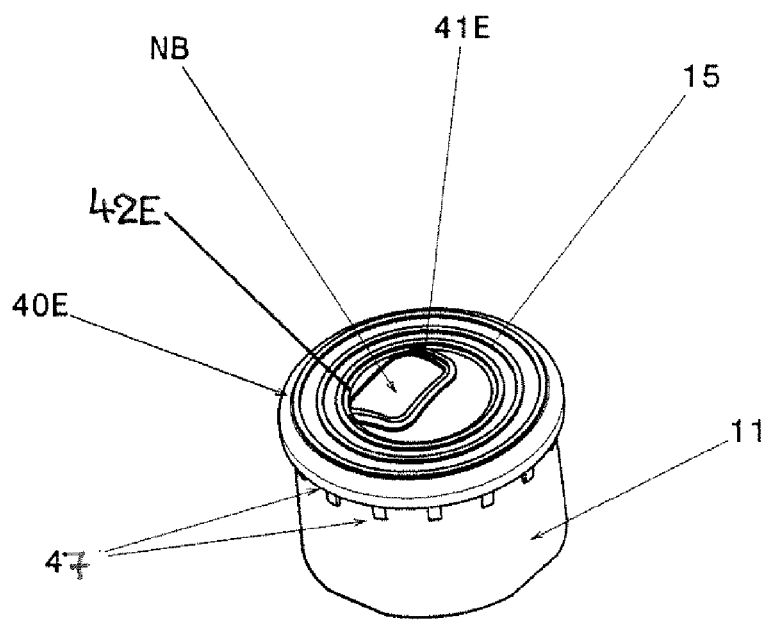
FIG. 10 shows a perspective representation of a camera system of a sixth embodiment in a mounted state.

In FIG. 10, a sixth embodiment of the protection element 40E is shown in a mounted state. The protection element 40E shown in FIG. 10 mainly differs from the previous protection elements 40, 40A, 40B, 40C and 40D in that it is provided with a plurality of (in FIG. 10: three) concentrically arranged outer notches 15 on its outer surface and with spring shackles 47 along is circumference. As already described with respect to the embodiment in FIG. 6, the outer notches 15 serve for swirling of air in order to urge water drops T, which are located on the use portion NB, toward a gap 42E and/or in order to hinder water drops T, which are located on the outer side of the protection element 40E to flow onto the use portion NB. As it is shown in FIG. 10, the sight opening 41E is configured approximately rectangular and is arranged off-center and eccentrically, respectively, with respect to the protection element 40E.

The spring shackles (rips) 47 are small metal plates, which project approximately vertically to the sight opening 41E from a distal edge of the protection element 40E along the circumference of the protection element 40E. Due to their elastic configuration, they allow a simple, but also reliable attachment of the protection element 40E at an optical element 11.

Figure 11:
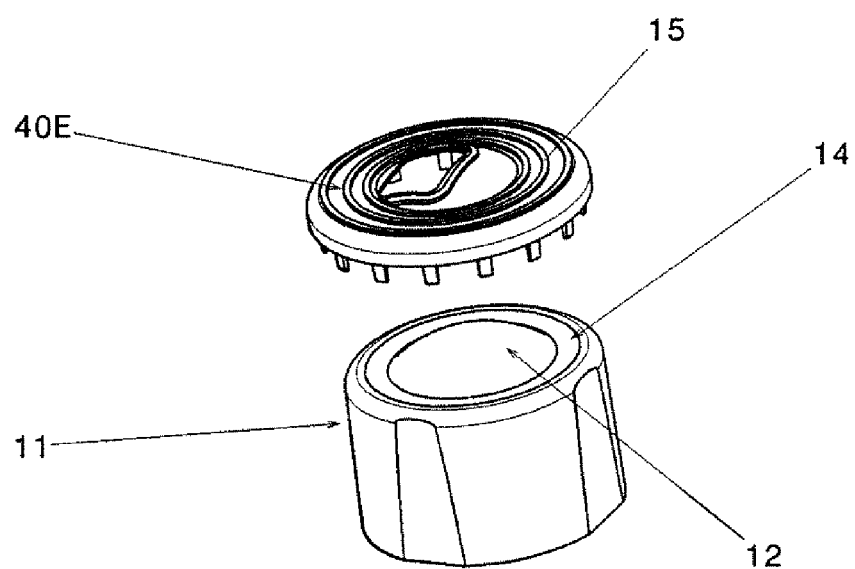
FIG. 11 shows a perspective representation of the camera system of FIG. 10 in a demounted state.

FIG. 11 shows the embodiment of protection element 40E shown in FIG. 10 in a demounted state. As shown in FIG. 11, an objective ring 14 is attached around the optical element 11 which objective ring 14 has a surface, which is inclined upwards to a center of the optical element such that a valley is present between the light incidence portion EB of the optical element 11 and the objective ring 14. This valley is disadvantageous without providing a protection element 40E and a gap 42E, because water drops T may entangle there. However, by providing the protection element 40E and the gap 42E, water drops T may also in this case be reliably transported away via the gap 42E and the water drainage opening 43E.

Figure 12:
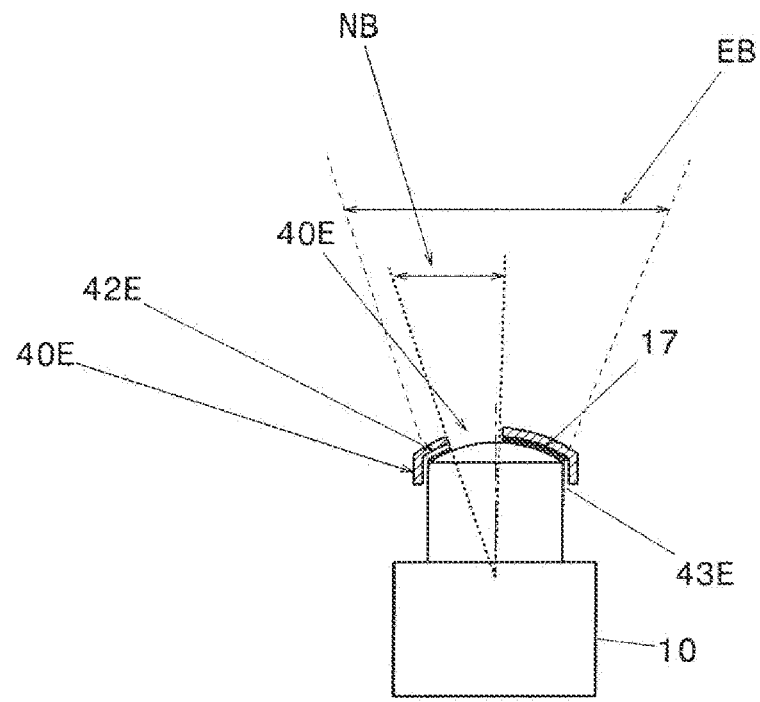
FIG. 12 shows a schematic representation of the camera system of FIG. 10 with a heating element.
Figure 13:
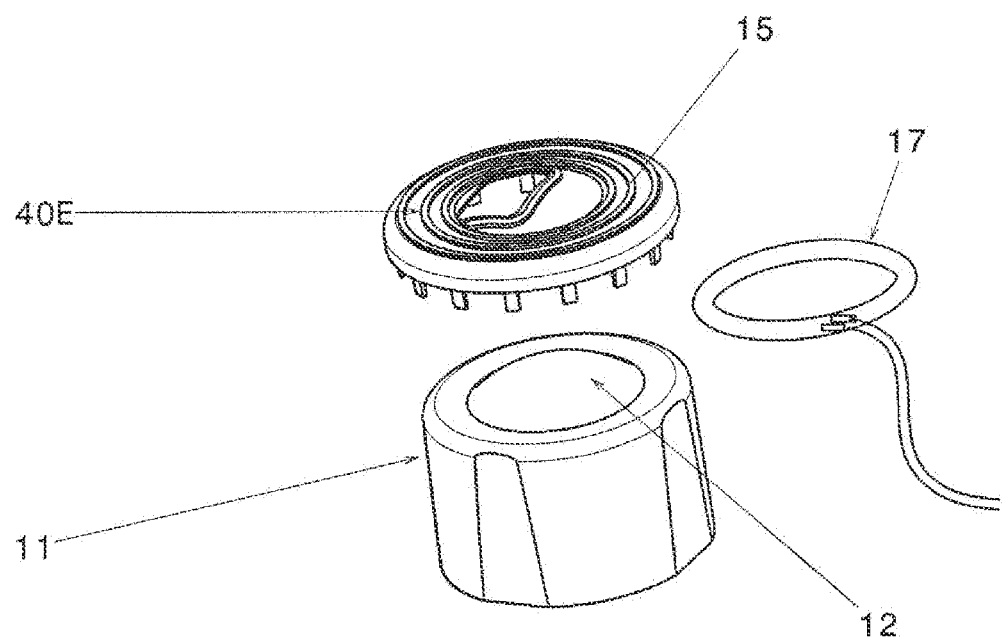
FIG. 13 shows a perspective representation of the camera system of FIG. 12.

FIGS. 12 and 13 show the protection element 40E of FIG. 11. In the gap 42E, a heating element 17 is introduced between the protection element 40E and the optical element 11. The heating element 17 is a ring-shaped element as shown in FIG. 13, which is energized with electricity via two cables and, thus, is heated. For example, the heating element 17 is a heating wire. Alternatively, the heating element 17 may also be a heating foil, which is preferably bonded on an inner side of the protection element 40E, which forms the gap 42E. The heating element 17 serves for deicing the camera and, in particular, the optical element or for removing condensed water from the optical element by evaporation.

Figure 14:
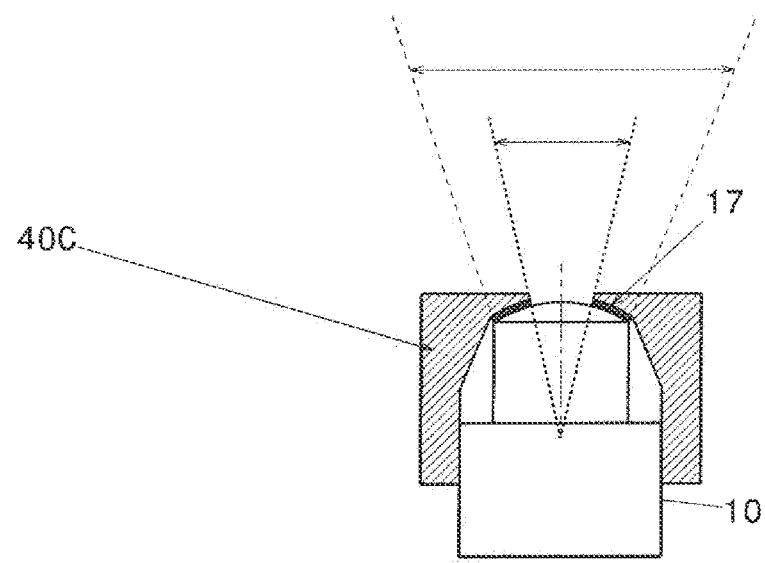
FIG. 14 shows a schematic representation of the camera system of FIG. 8 with heating element.

FIG. 14 shows the protection element 40C of FIG. 8 with a heating element in the gap 42C.

Figure 15:
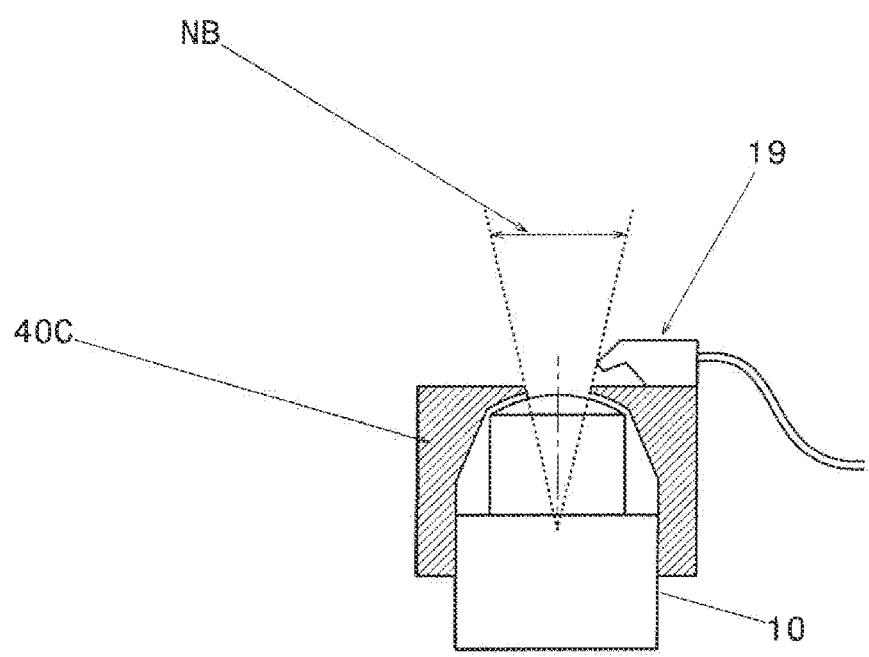
FIG. 15 shows a schematic representation of a camera system of FIG. 8 with air nozzle.

FIG. 15 shows the embodiment of protection element 40C of FIG. 8 with an air nozzle 19, which is attached to an outer surface of the protection element 40. The air nozzle 19 is configured for blowing air onto the use portion NB and, thus, for selectively urging the water drops T, which are potentially located there during operation, toward an edge portion of the use portion NB, i.e., toward the protection element 40C and the gap 42C. Alternatively, the air nozzle may also be arranged such that it hinders water drops T on an outer side of the protection element 40C to reach the use portion NB. There may also be provided more than one air nozzle and/or the air nozzle may be combined with a heating element 17.

Figure 16:
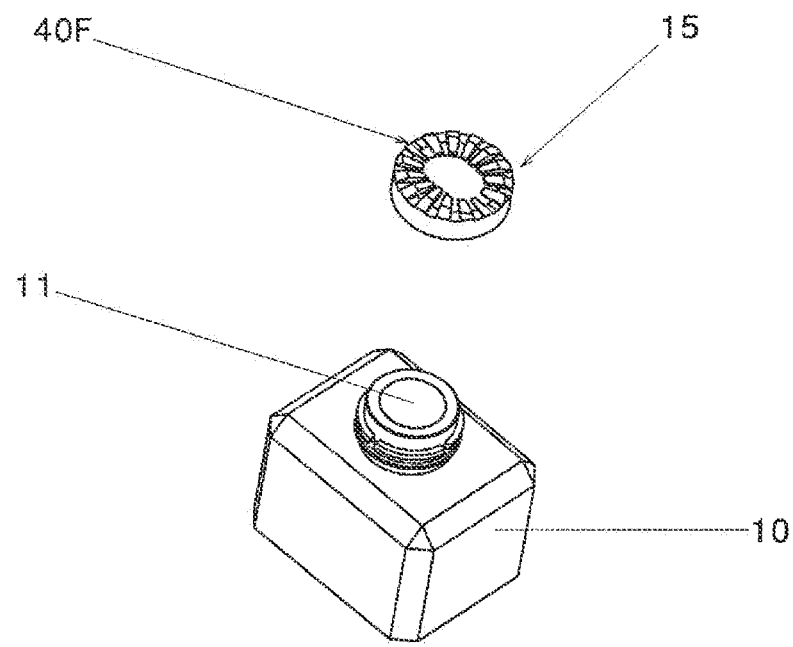
FIG. 16 shows a perspective representation of the camera system of FIG. 3 in a demounted state.
Figure 17:
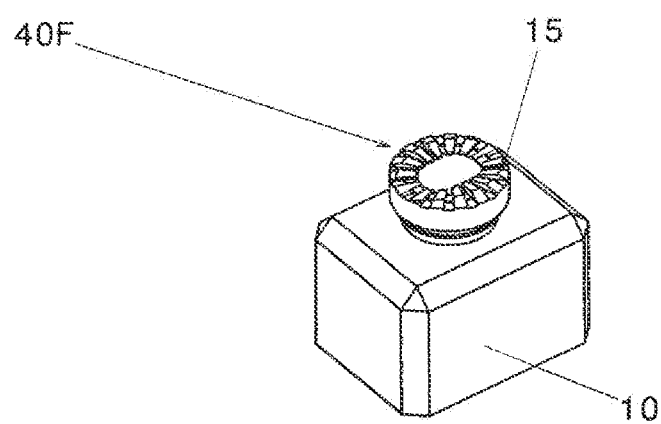
FIG. 17 shows a perspective representation of the camera system of FIG. 16 in a mounted state.

FIGS. 16 and 17 show a camera system according to the invention with a protection element 40F, which is configured as a lid, which is arranged in a certain distance on the optical element. The protection element 40F has outer notches, which run radially on the outer side, which lies opposite to the light incidence portion, which outer notches hinder water drops T on the outer side of the protection element 40F to reach onto the use portion NB. Rather, the water drops T on the outer side of the protection element 40F are urged into the outer notches by vibrations of the vehicle during driving operation and/or by air flow and, there, are radially guided to an outer circumference of the protection element. With the embodiment shown in FIGS. 16 and 17, the outer notches 15 are formed by ridges and ribs, which are applied onto a ring, which ridges and ribs, respectively, project in a direction radially inwards and, thus, form channels between the ribs into which also water drops T on the use portion NB may enter. It is also conceivable to provide the embodiment shown in FIGS. 16 and 17 without a gap between the protection element 40F and the optical element 11 such that water drops T on the use portion NB may be exclusively discharged via the outer notches 15.

Figure 18:
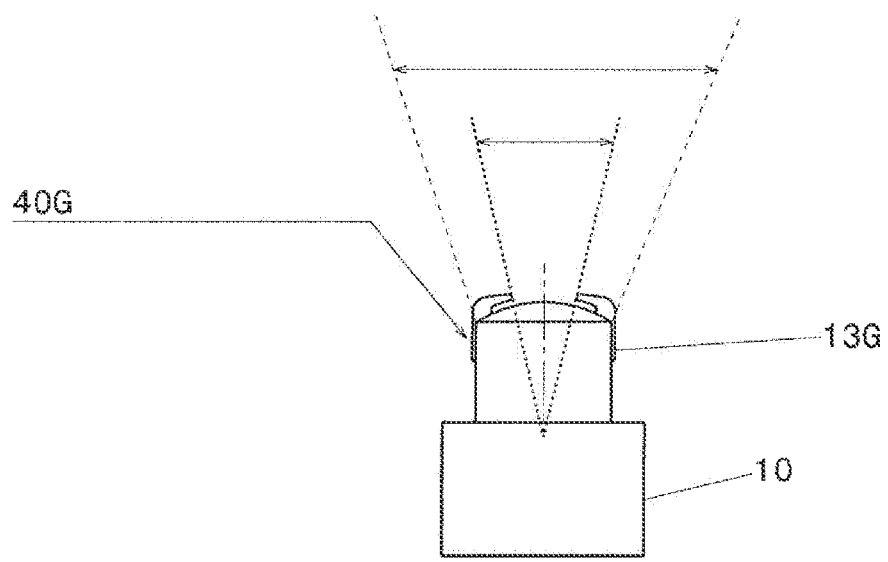
FIG. 18 shows a schematic representation of a further camera system.

FIG. 18 shows a camera system wherein the protection element 40G is integrated into the retainer 13G of the optical element 11, i.e., is preferably formed as a single component. In particular, in this case, a gap for discharging of water drops T, which are located on the surface of the optical element 11, may be configured to such that it uses capillary action.

Figure 19:
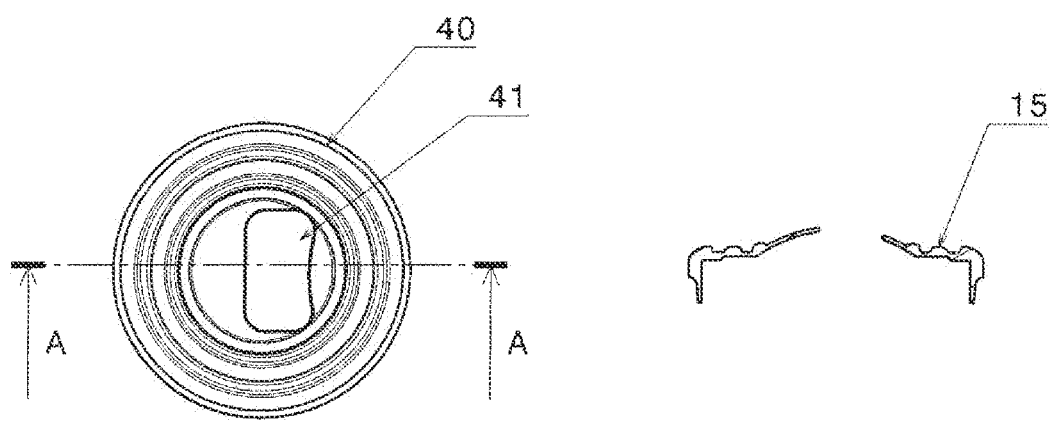
FIG. 19 shows a plan view on and a section through the protection element according to the invention of the first embodiment.

FIG. 19 shows a detailed plan view of and a cross section through the protection element 40 of the first embodiment. As it is shown in FIG. 19, the outer notches 15 are formed on the protection element 40 as to circles, which are concentrically arranged around the center of the protection element 40, and the gap 42 between the optical element 11 and the protection element 40 decreases/narrows from a portion, which is adjacent to the sight opening 41, toward an outer circumference of the light incidence portion.

Figure 20:
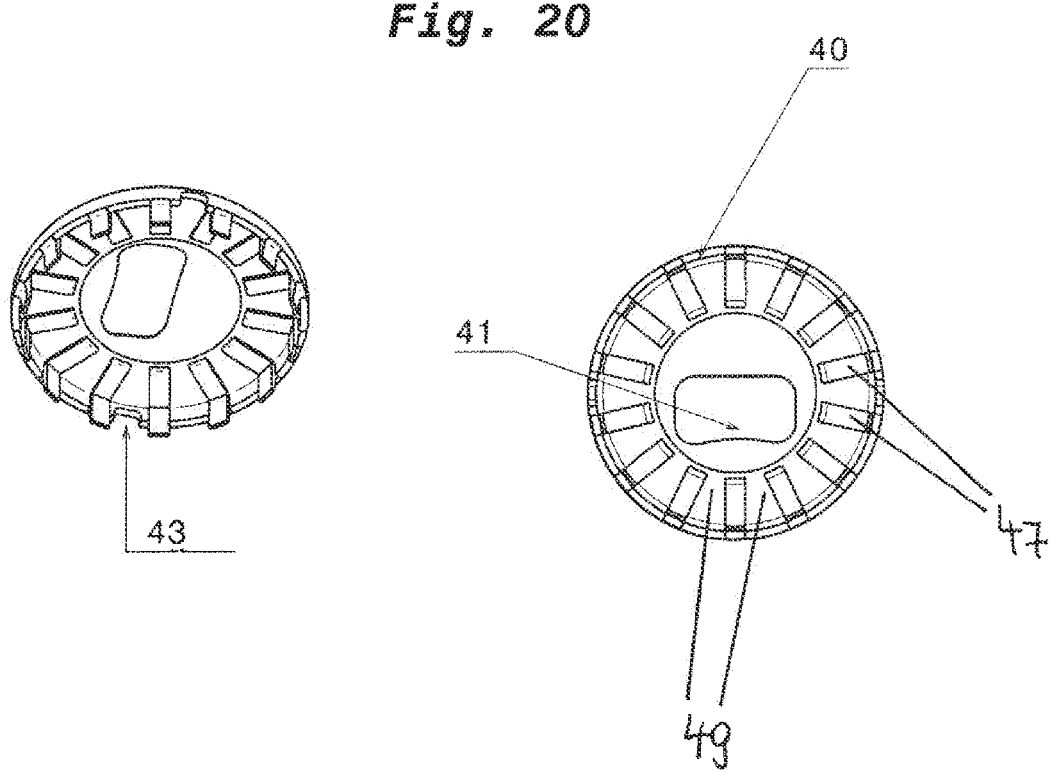
FIG. 20 shows different views of a protection element according to the invention.

FIG. 20 shows different views of the protection element 40. In particular, FIG. 20 shows a perspective lower view as well as a view directly from below of the protection element 40, which show that the gap 42 is formed by a plurality of inner notches 49, which run radially to an outer circumference of the protection element 40 and, thus, form channels for discharging of water drops T. With the embodiment shown in FIG. 20, the inner notches are formed by attaching ribs 47 on an inner surface of the protection element 40. Finally, it can further be taken from FIG. 20 that the water drainage opening 43 may be arranged at an edge of the protection element 40 as a groove.

In principle, it is also conceivable to provide the camera system without water drainage opening, as long as it is ensured that the water entering into the gap is that little that it is removed by evaporation before it accumulates in a noteworthy quantity in the gap.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A camera system for a vehicle (F), comprising:
   a camera for capturing a vehicle environment, wherein the camera has
      an optical element, which has a light incidence portion (EB), and
      a retainer, which supports the optical element, and
      a protection element, which is positioned separately to the optical element and the retainer at least on the light incidence portion (EB) of the optical element, has a sight opening, which exposes a use portion (NB) of the light incidence portion (EB), and has a defined coding for attachment at the correct position relative to the optical element,
   wherein at least one gap extends between the optical element and the protection element for capturing a water drop (T), which is located on the use portion (NB),
   wherein a water drainage opening is provided distally from the sight opening; and
   wherein the gap is formed by an inner notch having a longitudinal extension provided in at least one surface of the protection element, and said at least one surface faces the light incidence portion (EB) of the optical element.

2. The camera system according to claim 1, wherein the gap is dimensioned such that it develops a capillary action with receiving the water drop (T).

3. The camera system according to claim 1, wherein the optical element has a hydrophobic coating.

4. The camera system according to claim 1, wherein the gap has a cross section, which changes along its extension.

5. The camera system according to claim 1, wherein the inner notch radially extends toward an outer side of the light incidence portion (EB).

6. The camera system according to claim 1, wherein the inner notch spirally extends toward an outer side of the light incidence portion (EB).

7. The camera system according to claim 1, wherein the inner notch extends approximately concentrically around the sight opening of the protection element.

8. The camera system according to claim 1, wherein the inner notch has a cross section, which changes toward an outer direction of the light incidence portion (EB) laterally to the flowing direction of the water drop (T).

9. The camera system according to claim 1, wherein the inner notch forms a channel from the sight opening to the water drainage opening.

10. The camera system according to claim 1, wherein the gap is formed in that the surface of the protection element facing the optical element is spaced from the light incidence portion (EB) of the optical element.

11. The camera system according to claim 1, wherein the surface of the protection element facing the optical element has at least one rib for providing a defined distance of the protection element from the optical element.

12. The camera system according to claim 1, wherein an outer side of the protection element has a geometry, which causes an air swirl for promoting a movement of a water drop (T), which is located on the use portion (NB) toward the gap and/or for preventing a movement of a water drop (T), which is located on an outer side of the protection element, toward the sight opening.

13. The camera system according to claim 1, wherein the protection element has a nozzle, which applies a medium onto the light incidence portion (EB) of the optical element for promoting a movement of a water drop (T), which is located on the use portion, toward the gap and/or for preventing a movement of a water drop (T), which is located on the outer side of the protection element, toward the sight opening.

14. The camera system according to claim 1, wherein the protection element further has a heating element.

15. The camera system according to claim 14, wherein the heating element is arranged in the gap.

16. The camera system according to claim 14, wherein the heating element is a heating film.

17. The camera system according to claim 1, wherein the protection element is formed of a thermoplastic, a thermosetting plastic, an elastomer, a metallic material or combinations thereof.

18. The camera system according to claim 17, wherein the protection element has a Shore-hardness of less than 60 Shore.

19. The camera system according to claim 1, wherein the sight opening and the gap are dimensioned such that an adjustment of the camera in a certain range is possible without covering the use portion (NB) by the protection element and closing the gap.

20. The camera system according to claim 1, wherein the protection element has a hydrophilic coating.

21. The camera system according to claim 1, wherein the camera system is part of a mirror replacement system.

* * * * *